United States Patent [19]

Schreurs

[11] 4,340,512

[45] Jul. 20, 1982

[54] METHOD OF PROVIDING A UNIVERSAL COATING FOR FLUORESCENT LAMPS

[75] Inventor: Willy P. Schreurs, Danvers, Mass.

[73] Assignee: North American Philips Corporation, New York, N.Y.

[21] Appl. No.: 80,853

[22] Filed: Oct. 1, 1979

[51] Int. Cl.³ .............................................. C08L 1/08
[52] U.S. Cl. ..................................... 523/122; 427/67; 523/310; 524/45; 524/430; 524/337; 524/556; 524/403; 524/441
[58] Field of Search ........................ 427/67; 260/17 R

[56] References Cited

U.S. PATENT DOCUMENTS

| | | | |
|---|---|---|---|
| 2,824,814 | 2/1958 | Jones et al. | 427/67 |
| 3,424,605 | 1/1969 | Beaumont et al. | 427/67 |
| 3,833,398 | 9/1974 | Schreurs | 427/67 |
| 4,148,935 | 4/1979 | Schreurs | 427/67 |

FOREIGN PATENT DOCUMENTS 45-7434  3/1970  Japan .

*Primary Examiner*—V. P. Hoke
*Attorney, Agent, or Firm*—Robert S. Smith

[57] ABSTRACT

A method of preparing phosphor suspensions for coating fluorescent lamps wherein the temporary organic binder is an association compound of purified carboxy methyl cellulose and polyethylene oxide in such proportions as to avoid the gelation caused by ionizable phosphors releasing multivalent cations.

7 Claims, 2 Drawing Figures

4,340,512

METHOD OF PROVIDING A UNIVERSAL COATING FOR FLUORESCENT LAMPS

BACKGROUND OF THE INVENTION

This invention relates to phosphor coatings applied on the inner wall of electrical discharge devices and particularly those containing phosphors such as oxides, silicates, germanates, tungstates and phospho-vanadates which are known to cause the gelation of most water-base coating suspensions.

In the conventional method of applying a film of phosphor on the inner wall of fluorescent lamps the phosphor, or phosphor mixture, is suspended in a viscous medium consisting of an organic binder dissolved in a solvent.

The phosphor suspension which also contains an inorganic binder is flushed down the glass envelope and dried by applying heat and air to evaporate the solvent. The dried coated bulbs are then subject to a lehring process at a temperature of approximately 600° C. in order to burnout all the organic matters and then proceed to the conventional finishing operations of the fluorescent lamp manufacture. Economic considerations and compliance with environmental regulations have emphasized the advantages of water-soluble binders over organic solvent binders in the preparation of phosphor coatings.

The stability of water-base coating suspensions is of primary importance not only to achieve even smooth phosphor films but also to avoid the loss of very expensive phosphors such as used in the high efficiency lamps. Examples of such phosphors are: Europium activated Yttrium oxide, Terbium-Cerium activated Magnesium Aluminate, Europium activated Barium Magnesium Aluminate and mixtures thereof.

Difficulties in maintaining the phosphor coating stability arise when the slight solubility of the phosphors releases polyvalent cations which cross-link with the organic binder and cause the gelation of the coating.

In British Pat. No. 1,467,724 this lack of stability is overcome by the use of hydroxy-propyl cellulose. In British Pat. No. 1,506,334 the use is taught of an ammonium or magnesium alginate water-soluble binder.

Beside stability phosphor coating suspensions have many requirements reflected by the number of patents already in existence.

For instance it is desired to achieve the proper viscosity with the minimum amount of binder. This is usually the case when the binder is carboxy methyl cellulose as in U.S. Pat. No. 2,824,814.

In U.S. Pat. No. 2,987,414 the use of poly vinyl methyl ether and maleic anhydride is claimed to produce a densely packed phosphor film. This organic binder however requires relatively higher lehring temperatures detrimental to the fluorescent lamp efficiency.

Polyoxyethylene is a water-soluble binder of medium high viscosity. Its ash content is well over 1% and contains a high proportion of silica, one of the most detrimental contaminants in fluorescent lamps.

Hydroxyethyl cellulose and many other water-soluble cellulose derivatives tend to produce grainy coatings. Homopolymers and copolymers of acrylic acid are hard to bakeout and tend to leave a slight discoloration of the phosphor film.

Another aspect of the water-base phosphor coatings is the lack of adherence after the lehring operation which causes a high shrinkage during the manufacture and loss of finished products due to peeling off during transportation.

Additions of a permanent inorganic binder are claimed in U.S. Pat. Nos. 3,424,605 and 3,424,606 by using $Ba(NO_3)_2$. The easy conversion of the nitrate into carbonate however tends to void the effect of the addition.

Barium phosphate and phosphoric acid claimed in U.S. Pat. No. 3,551,180 are detrimental to the maintenance of the fluorescent lamps and the same applies to the addition of $Sr_2P_2O_7$ claimed in U.S. Pat. No. 3,636,352.

It is an object of this invention to provide a method for preparing a water-soluble binder having none of the aforesaid drawbacks.

A further object is to provide a method of achieving a stable dispersion of inorganic binder into said water-soluble binder.

Still another object is to provide a method of preparing a universal water-base coating suspension applicable to all phosphors and particularly those which tend to release polyvalent cations under hydrolysis.

SUMMARY OF THE INVENTION

In accordance with the invention a solution of purified copolymer of carboxy-methyl cellulose-polyoxy ethylene is produced by association reaction and in proportions sufficient to cross-link the polyethylene oxide with the carboxyl groups in the carboxymethyl cellulose.

The cross-linking readily occurs in water solutions of the two polymers and prevents the gelation of the carboxymethyl cellulose in presence of multivalent cations.

Solutions containing 1.5 weight % by volume of the mixed polymers in the ratio of 60 parts carboxymethyl cellulose to 40 parts polyoxyethylene have been found perfectly stable in presence of $Y^{3+}$ and $Ca^{2+}$ ions.

The copolymer solutions according to the invention possess the required purity, the high viscosity and the anionic character desirable for the production of smooth densely packed phosphor films.

Suitable phosphor coatings have been prepared with less than 1% dry weight of binder relative to phosphor. Besides a relatively fast drying these coatings have an exceptional baking ability partly due to the low decomposition temperature of the polyoxyethylene.

The permanent binding agent in the phosphor water-base coatings according to the invention is a stable anionic suspension of submicron size $Al_2O_3$ separately prepared by dispersing the $Al_2O_3$ particles in a 1% water solution of low molecular weight polyacrylic acid neutralized with monoethanolamine to a pH slightly above 9.1, the isoelectric point.

DESCRIPTION OF THE PREFERRED EMBODIMENTS 24 grams of polyoxyethylene WSRN-3000 sold by Union Carbide Chemicals under the trademark of "POLYOX" is dissolved in 1000 ml deionized water and centrifuged in a solid bowl type decanter to separate the solid impurities consisting of $SiO_2$ and $CaCO_3$. The clear liquid is added to a separately prepared solution made of 36 grams of very high viscosity carboxymethyl cellulose dissolved in 3000 ml deionized water.

The 7HOF grade carboxymethyl cellulose from Hercules Inc. is particularly suitable since it has the best solubility in acid media.

The mixed solutions are next purified of all the dissolved cations, including the sodium from the carboxymethyl cellulose by the well known ion exchange process in which the hydrogen ion of the ion exchange resin replaces the cations in the solution.

The resulting purified copolymer solution is neutralized with ammonia to pH 7.0 to 7.5 and protected from microbiological degradation by adding 0.5 gram of preservative such as Thymol, Phenol or Formaldehyde.

Figure 1:
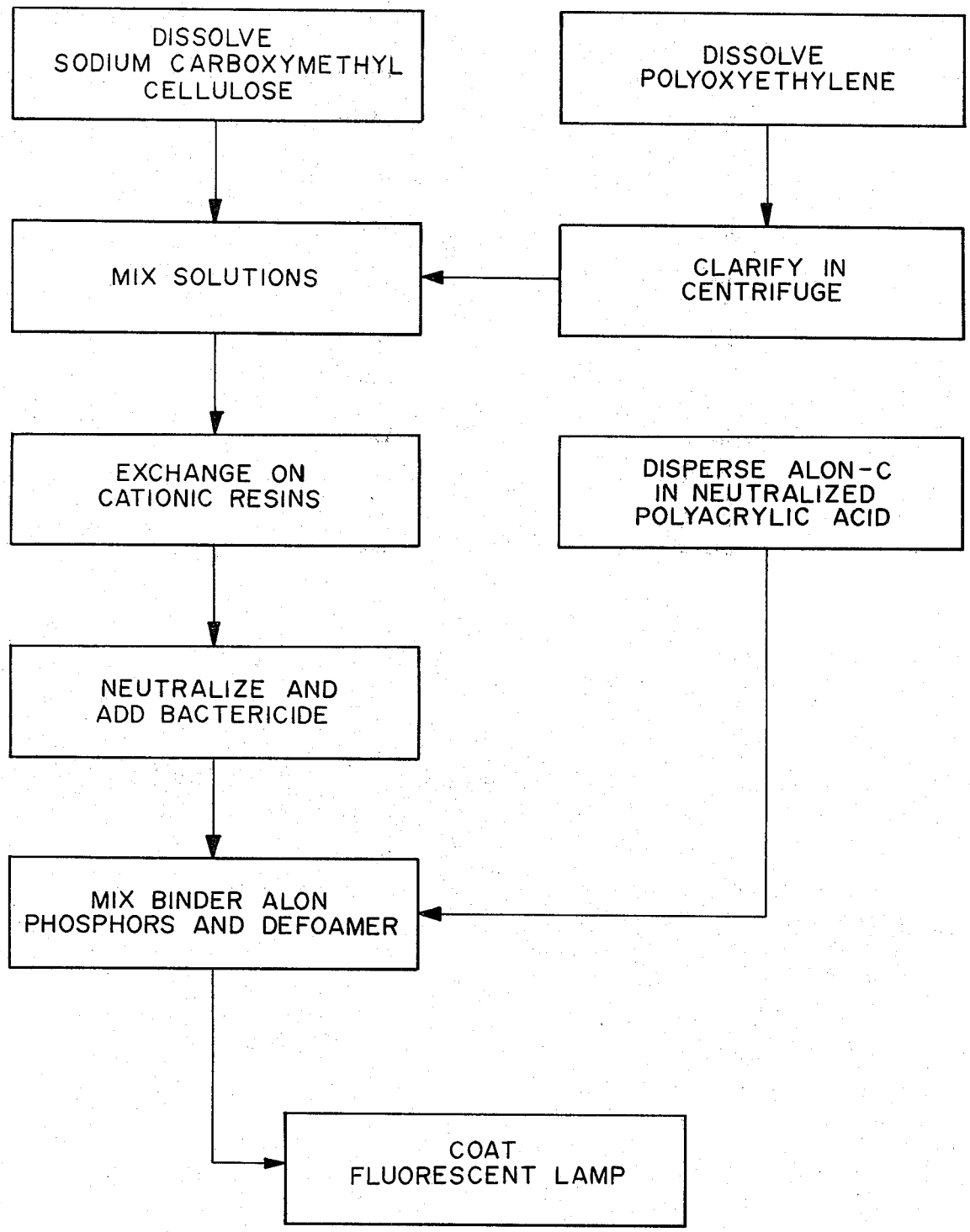
FIG. 1 is a flow chart explaining the various steps of preparing a fluorescent lamp water-base coating according to the invention.
Figure 2:
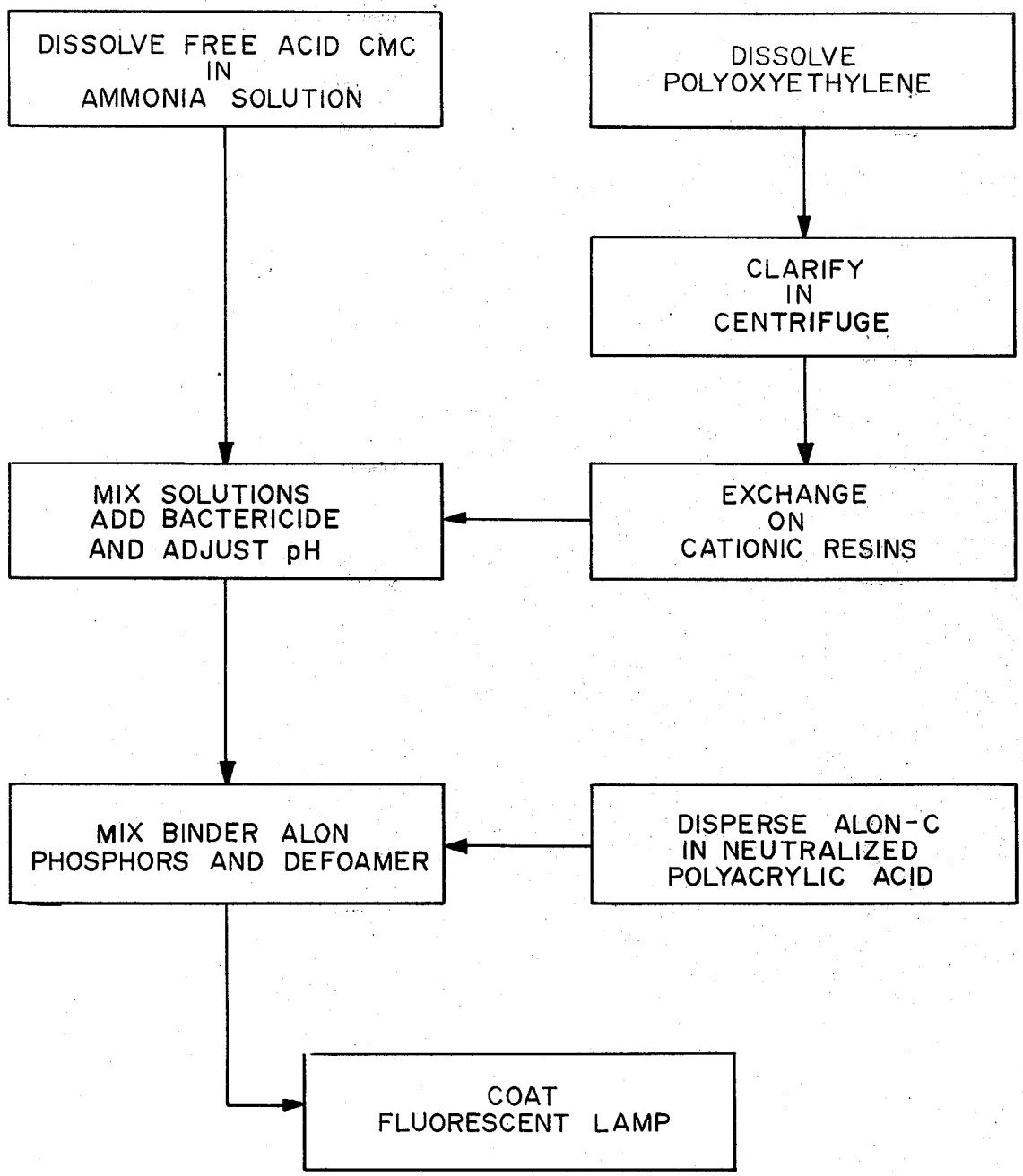
FIG. 2 is an alternate flow chart followed when using the free acid type carboxymethyl cellulose.

In an alternative method shown in FIG. 2 the need of purifying the carboxymethyl cellulose is eliminated by the use of the free acid type neutralized with ammonia.

The free acid type carboxymethyl cellulose however is not always available and several times more expensive than the sodium carboxymethyl cellulose. The method of preparing the water-base coating remains essentially unchanged except that the polyethylene oxide solution alone is subjected to the ion exchange process.

The permanent inorganic binder suspension is prepared by dissolving 10 grams of low molecular weight polyacrylic acid in 1000 ml deionized water, neutralizing to pH 9.1 to 9.5 with monoethanolamine and adding the submicron size $Al_2O_3$ to the liquid under high speed agitation.

A homopolymer of acrylic acid sold under the trademark "PERCOL E-5" having a molecular weight of approximately 3,500 and sold by Allied Colloids Inc. is highly suitable to disperse the submicron size $Al_2O_3$ such as ALON-C from Cabot Corp.

As reported in the technical data the average particle size of ALON-C is 0.03 micron and negatively charged particles can be prepared when dispersed in water containing polyvalent anions at high pH values.

$Al_2O_3$ particles which are positively charged in water suspensions readily flocculate in anionic media. In the suspension according to the invention the $Al_2O_3$ particles are neutral or negatively charged and become perfectly compatible with the copolymer binder.

In order to check the stability of a phosphor suspension the following coating was prepared by mixing together
80 ml of the copolymer binder solution
20 ml of Alon C suspension
100 grams Yttrium oxide phosphor
100 grams Magnesium fluo-germanate phosphor
0.1 grams (2-drops) Defoamer
150 ml deionized water The defoamer was "PLURONIC 31R1" manufactured by Basf Wyandotte Corp.

After the phosphors have been dispersed the coating is screened through a 270 mesh nylon screen.

Alternatively the phosphor coating preparation consists in ball-milling all the ingredients until the proper fineness of grind is achieved.

The final adjustment prior to coating fluorescent lamps consists in adding deionized water to lower the specific gravity to the level needed by the particular coating process to be used.

In order to check the stability of the suspension the above coating was kept rolling (mildly agitated) in a closed container for 45 days without any gelation or loss of coatability. The two phosphors selected for the experiment were among the most difficult to maintain in stable coating suspensions and after the 45 days of contact the liquid portion was found to contain 9.5 ppm $Mg^{2+}$ and 3.8 ppm $Y^{3+}$.

In another example of phosphor coating preparation according to the invention the phosphor used was the well known halophosphate all other constituents being the same as in the first example.

A control coating using the same phosphor was also prepared with the well known nitrocellulose in butyl acetate binder and the same amount of Alon C. Coating parameters were adjusted to achieve the same loading of 4.9 mg of phosphor per $cm^2$ in 40T12 fluorescent bulbs.

After baking sections of the coated glass were cut in the center of the bulbs and the phosphor film thickness measured at several points around the periphery. Whereas the control coating in nitrocellulose averaged 43 microns in thickness the phosphor film obtained with the water-base coating averaged only 35 microns.

As is well known in fluorescent lamp manufacturing a more compact phosphor film is beneficial to the brightness and maintenance of the lamp because it reduces the scattering and the glass solarization.

These two examples clearly demonstrate the uniqueness and the novelty of the phosphor coating according to the invention. While retaining the advantages of the carboxymethyl cellulose: high viscosity and anionic character the new coating overcomes its major drawback: instability with a number of hydrolyzable phosphors. The concentration of polyoxyethylene in its initial solution is low enough to achieve the removal of submicron size silica. Technical data from manufacturers show that a viscosity of approximately 3000 centipoises is achieved with 0.9 percent concentration of carboxymethyl cellulose.

To achieve a comparable viscosity with polyoxyethylene alone would require a concentration of approximately 5%. At this concentration and viscosity it was found impossible to remove the silica particles of 0.1 micron found in the polyoxyethylene.

The other novel feature of the coating according to the invention is the preparation of a stable anionic disperion of submicron size $Al_2O_3$.

Whereas polyacrylic ammonium salts having a molecular weight of approximately 1 million have been used as binders in phosphor coatings the Alon C suspension of the invention uses the polyacrylic salt as a dispersing agent.

The concentration of the polyacrylate in the final coating does not exceed 0.1% by weight of the phosphor and no detrimental effect can be detected on the baking properties of the phosphor film.

I claim:
1. A method for preparing a universal water-base suspension for coating the interior surface of fluorescent lamps, said method comprising:
(a) preparing a temporary binder solution of polyoxyethylene in water at concentrations ranging from 1.5 to 2.5 weight by volume percent and removing the contaminating particulates of silica and Ca $CO_3$ by centrifuging;
(b) preparing a temporary binder solution of sodium carboxymethyl cellulose in water at concentrations ranging from 1.2 to 2.5 weight by volume percent;

(c) mixing said temporary binder solutions and removing the contaminating cations by an ion exchange process;

(d) neutralizing said purified temporary binder solution with ammonia to a pH 7.0 to 7.5 and adding between 0.01 and 0.02 weight by volume percent of bactericide;

(e) preparing an inorganic binder suspension of submicron size $Al_2O_3$ in water solution of low molecular weight polyacrylic acid neutralized to a pH 9.0 to 9.5 with monethanolamine, said suspension containing 0.5 to 1.5 weight by volume percent polyacrylic acid and 5 to 15 weight by volume percent of $Al_2O_3$; and (f) mixing said temporary binder solution and inorganic binder suspension with phosphors and defoamer in such proportions as to contain a ratio of 0.5 to 1.5 weight percent of dry binder to phosphor and 0.02 to 0.1 weight percent of defoamer to phosphor.

2. A method for preparing a universal water-base suspension for coating the interior surface of fluorescent lamps, said method comprising:

(a) preparing a temporary binder solution of polyoxyethylene in water at concentrations ranging from 1.2 to 2.5 and preferably 2 weight by volume percent and removing the contaminating particulates of silica and $Ca\ CO_3$ by centrifuging;

(b) preparing a temporary binder solution of sodium carboxymethyl cellulose in water at concentrations ranging from 1.2 to 2.5 and preferably 1.5 weight by volume percent;

(c) mixing said temporary binder solutions and removing the contaminating cations by an ion exchange process;

(d) neutralizing said purified temporary binder solution with ammonia to a pH 7.0 to 7.5 and adding between 0.01 and 0.02 weight by volume percent of bactericide;

(e) preparing an inorganic binder suspension of submicron size $Al_2O_3$ in water solution of low molecular weight polyacrylic acid neutralized to a pH 9.0 to 9.5 with monethanolamine, said suspension containing 0.5 to 1.5 and preferably 1.0 weight percent polyacrylic acid and 5 to 15 and preferably 10 weight by volume percent of $Al_2O_3$; and (f) mixing said temporary binder solution and inorganic binder suspension with phosphors and defoamer in such proportions as to contain a ratio of 0.5 to 1.5 of dry binder and 0.02 to 0.08 of defoamer.

3. A water-base phosphor suspension for coating the interior surface of fluorescent lamps prepared by the method specified in claim 1 or 2 and containing carboxymethyl cellulose and polyoxyethylene in ratios ranging between 80 to 20 and 50 to 50.

4. A water-base phosphor suspension according to claim 3 wherein the ratio of carboxymethyl cellulose to polyoxyethylene is 60 to 40.

5. The method as described in claim 2 wherein:
said step of mixing said temporary binder solution in inorganic binder suspension with phosphors and defoamers is in such proportions as to contain a ratio of substantially 0.6 weight percent of dry binder and substantially 0.05 weight percent of defoamer.

6. The suspension as described in claim 3 wherein:
said step of mixing said temporary binder solution in inorganic binder suspension with phosphors and defoamers is in such proportions as to contain a ratio of substantially 0.6 weight percent of dry binder and substantially 0.05 weight percent of defoamer.

7. The suspension as described in claim 4 wherein:
said step of mixing said temporary binder solution in inorganic binder suspension with phosphors and defoamers is in such proportions as to contain a ratio of substantially 0.6 weight percent of dry binder and substantially 0.05 weight percent of defoamer.

* * * * *